June 8, 1926.

B. M. W. HANSON

GAUGE

Filed Oct. 22, 1924

1,588,361

Inventor

Bengt M. W. Hanson

K. Clay Lindsey

His Attorney

Patented June 8, 1926.

1,588,361

UNITED STATES PATENT OFFICE.

BENGT M. W. HANSON, OF HARTFORD, CONNECTICUT; EINAR A. HANSON AND CLARENCE E. WHITNEY EXECUTORS OF SAID BENGT M. W. HANSON, DECEASED.

GAUGE.

Application filed October 22, 1924. Serial No. 745,129.

This invention relates to screw testing devices and, more particularly, to thread gauges of the type commonly called plug gauges.

An object of the present invention is to provide a gauge of such improved construction and arrangement that the life of usefulness thereof is substantially double that of gauges as heretofore constructed, while, at the same time, the cost of manufacturing the gauge is not to any material extent increased. In accordance with the present invention, the gauge has a handle and a gauging member provided, at each of its ends, with a gauging thread, the threads being independent of each other to the extent that, when either is employed for gauging purposes, the other is not so used. The gauging member is secured to the handle in such manner that one of the gauging threads may be used for gauging purposes, and the other thread is received by, and housed within, the handle so that it is protected against mutilation or other damage. When the thread at one end of the gauging member becomes worn, the member is detached from the handle and the worn end is secured within the handle, and the other end, which previously was housed within the handle, is used for gauging purposes.

A further aim of the invention is to provide a gauge of the character described wherein the gauging member may be very securely fastened to the handle in a simple and efficient manner.

A further object is to provide a gauge of the character described which consists of a relatively few number of parts and which may be economically manufactured.

Other objects will be in part obvious and in part pointed out more in detail hereinafter.

The invention accordingly consists in the features of construction, combination of elements and arrangement of parts which will be exemplified in the construction hereinafter set forth, and the scope of the application of which will be indicated in the appended claims.

In the accompanying drawings, wherein I have shown, for illustrative purposes, two embodiments which the present invention may take, Figure 1 is a side elevational view of the gauge with the handle in longitudinal section;

Figure 1:
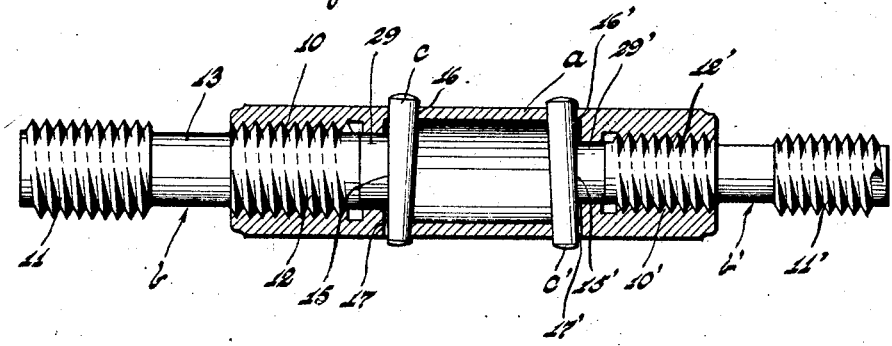

Referring to the drawings in detail, $a$ denotes a handle; $b$, a gauging member, and $c$, a wedge for binding the gauging member relative to the handle.

In the present illustrative disclosures, the handle is of generally tubular form and, preferably, its external periphery is polygonal, as for example, hexagonal, so that the device, when laid on a surface, will not roll. In the embodiment of Fig. 1, gauging members $b$ and $b'$ are secured to the opposite ends of the handle. Since the constructions at the opposite ends of the handle are similar, a description of one is illustrative of both. The gauging member $b$, in the present instance, comprises a generally cylindrical part having, at its opposite ends, threads 11 and 12 which are generally similar. By way of illustration, these threads are shown as being identical in construction, that is, of the same pitch, diameter, shape and size. If desired, the gauging member, intermediate its ends, may have an unthreaded portion 13. The gauging member may be considered as having a single thread extending substantially throughout its length, the thread being interrupted to form the portion 13. It will be understood, however, that the threads 11 and 12, in effect, are distinct, in that only one is used for gauging purposes at a time and, therefore, when one is used for gauging purposes there is no wear on the other.

The arrangement is such that either end of the gauging member $b$ may be housed and secured within, and protected by, the handle. In the present instance, the handle is, by preference, hollow throughout its length and is provided at, at least, one of its ends with an internal screw thread. In Fig. 1, the handle is shown as having internal threads 10 and 10' at its opposite ends, these threads being complementary to the gauging threads of the respective gauging members b and b'. The handle, by preference, is of softer metal than the gauging member.

Figure 2:
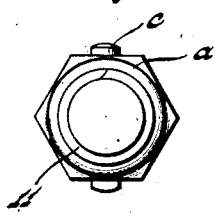
Fig. 2 is an end view thereof.
Figure 3:
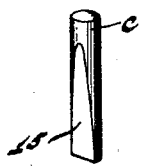
Fig. 3 is a perspective view of a wedge employed for binding the parts together.

Means is provided for binding the interengaging threaded portions of the handle and gauging member together so that the gauging member will not rotate relative to the handle and become loose. In the present instance, this binding means is in the form of a wedge c, but, except as defined in certain of the appended claims, the invention is not limited to this specific arrangement. In the embodiment of Figs. 1 to 3, inclusive, the ends of the gauging member are flat and, preferably, lie in planes to which the axis of the gauging member is normal, and the wedge has a face 15 parallel to the planes of the ends of the gauging member. The wedge may directly engage the inner end of the gauging member, but, preferably, there is interposed, between the wedge and gauging member, a washer or part 29 of relatively softer metal than the gauging member so as to avoid injury to the latter when the wedge is driven home. The wedge is generally of cylindrical form and is positioned in, and extends through, holes 16 and 17 in opposite sides of the handle. The axes of the holes 16 and 17 are disposed at an angle to a line perpendicular to the axis of the handle.

Figure 4:
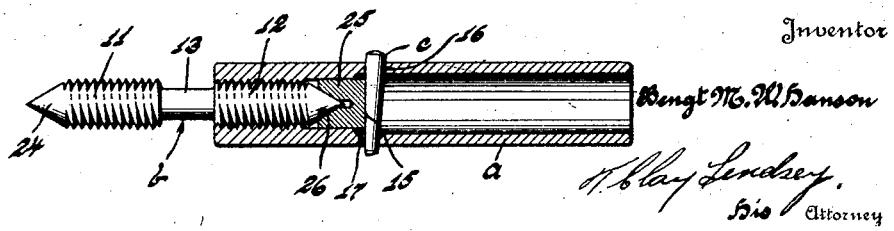
Fig. 4 is a view similar to Fig. 1, but showing a slightly different embodiment.

In the embodiment shown in Fig. 4, the extreme ends of the gauging member are tapered or conical, as at 24. This arrangement may be adopted where the gauging member is of such small diameter that it is preferable, during the operation of grinding the threads, to support the gauging member between centers having recesses receiving these conical ends. In this case, there is interposed, between the wedge c and the inner end of the gauging member, a part 25 having at one end a conical recess 26 receiving the conical portion 24 of the gauging member.

From the foregoing description, it will be clear that, when the gauging member and handle are assembled, one of the gauging threads, for instance that designated by the numeral 11, may be employed for gauging purposes while the other gauging thread 12 is housed within, and protected by, the handle. After the gauging thread 11 has become worn, the wedge may be knocked from place, the thread 12 unscrewed from the thread 10, the gauging member turned end for end, and the gauging thread 11 screwed into the handle, after which the wedge is driven home with a tap of a hammer. The gauging thread 12 may now be used for gauging purposes. It is to be observed that the cost of manufacturing the gauging member with a gauging thread at each end and the handle is little, if any, greater than that of manufacturing a gauging member having a thread at one end only and a shank at the other end, and a handle in which the shank has a taper fit. At the same time, a device, constructed in accordance with the present invention, has twice the life of a gauge having a plug with a single gauging thread. The threads 11 and 12 may be cut on the gauging member in a single operation and, to finish the gauging member, the same may be rotatably mounted on centers, and a grinding wheel may be moved longitudinally of the gauging member from one end to the other thereof so as to accurately grind both of the threads 11 and 12.

The manner in which the gauging member is secured to the handle is of distinct advantage. One of the gauging threads of the gauging member is screwed into the handle and then the interengaging threaded portions of the handle and gauging member are bound together, in the present instance this binding action resulting from longitudinally moving the gauging member relative to the handle by means of the wedge. This arrangement is not only very simple and economical in construction, but it is very effective in that it securely and rigidly holds the parts together. I am aware that some positive interlocking means may be provided between the wedge and the gauging member, but in actual practice the arrangement shown meets all requirements. The tightening or binding of the parts together by means which moves the handle and gauging member axially without relatively turning them is more efficacious than attempting to bind the threads together by screwing the gauging member against an abutment on the handle. In this latter event, considerable force is necessary, on account of the large interengaging frictional surfaces between the threads, to bind the threads tightly together and, in exerting such a force, it would be necessary to provide a fixture of some sort or another for gripping the protruding end of the gauging member so that it would not turn when the handle was turned. Further than that, if the gauge thread were brought into binding action with the thread on the handle by merely turning the gauge member up against an abutment on the handle, the very minute projections on the gauging thread (which projections would be present no matter how finely the faces of this thread were finished) would either be sheared off or would cut fine grooves in the faces of the thread of the handle. When a force is exerted on the gauging member opposite to that when screwing the plug into the handle, there is a possibility that the parts would become unscrewed because the projections have been sheared off or those which have not been sheared off would follow in the grooves which they have already formed. By moving the gauging member longitudinally, as by means of the wedge c, after the gauging plug is screwed into the handle, the multiplicity of minute projections on the gauging thread will become embedded in the relatively softer metal of the thread on the handle and will thus lock the parts together.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. A gauge of the character described including a gauging member having a gauging thread at each end, and a handle into which either of said gauging threads is adapted to be screwed.

2. A gauge of the character described including a gauging plug having a gauging thread at each end, a handle adapted to receive either of said threads of said gauging plug, and wedge acting means for binding said plug within said handle.

3. A gauge of the character described including a gauging plug having a gauging thread at each end, a handle having screw thread means complementary to and adapted to receive the threads of said gauging plug, and wedge acting means for binding the interengaging threaded portions.

4. A gauge of the character described including a gauging member having at its opposite ends substantially alike screw threaded portions, a handle having a threaded portion complementary to the threaded portions of said gauging member and adapted to selectively receive the same, and means carried by said handle and movable relative thereto for binding the interengaging threaded portions of the handle and gauging member together.

5. A gauge of the character described including a gauging member having a thread at each end, an elongated handle into which each of said threads is adapted to be screwed, and means for urging the gauging member longitudinally of the handle to bind the parts together.

6. A gauge of the character described including an elongated gauging member having screw threaded portions at its opposite ends, an elongated handle having a threaded portion complementary to the threaded portions of said gauging member and adapted to selectively receive the same and a wedge for urging the handle and gauging member longitudinally in opposite directions to bind together the interengaging threaded portions therebetween.

7. A gauge of the character described including an elongated gauging member having screw threaded portions at its opposite ends, an elongated handle having a threaded portion complementary to the threaded portions of said gauging member and adapted to selectively receive the same, a wedge for urging the handle and gauging member longitudinally in opposite directions to bind together the interengaging threaded portions therebetween, and a relatively soft part between said gauging member and wedge.

8. A gauge of the character described including an elongated gauging member having at its opposite ends substantially alike screw threaded portions, an elongated handle having a threaded portion complementary to the threaded portions of said gauging member and adapted to selectively receive the same, and a wedge extending transversely of said handle and cooperating with said member, said wedge having a face disposed in a plane at right angles to the longitudinal axis of the gauging member.

BENGT M. W. HANSON.